US011148799B2

(12) United States Patent
Robertson et al.

(10) Patent No.: US 11,148,799 B2
(45) Date of Patent: Oct. 19, 2021

(54) TILTING DUCT COMPOUND HELICOPTER

(71) Applicant: Textron Innovations Inc., Providence, RI (US)

(72) Inventors: Daniel Robertson, Southlake, TX (US); Kirk Groninga, Keller, TX (US); Matthew Louis, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 255 days.

(21) Appl. No.: 16/200,024

(22) Filed: Nov. 26, 2018

(65) Prior Publication Data

US 2020/0164975 A1    May 28, 2020

(51) Int. Cl.
| | | |
|---|---|---|
| *B64C 29/00* | (2006.01) | |
| *B64C 11/00* | (2006.01) | |
| *B64C 11/46* | (2006.01) | |
| *B64D 27/24* | (2006.01) | |

(52) U.S. Cl.
CPC ........ *B64C 29/0033* (2013.01); *B64C 11/001* (2013.01); *B64C 11/46* (2013.01); *B64D 27/24* (2013.01)

(58) Field of Classification Search
CPC ........ B64C 27/22; B64C 27/26; B64C 27/025
See application file for complete search history.

(56) References Cited

U.S. PATENT DOCUMENTS 2,130,918 A * 9/1938 De Stefano ............. B64C 27/28
244/17.21
2,991,026 A * 7/1961 Nelson ................ B64C 29/0016
244/12.4
(Continued)

FOREIGN PATENT DOCUMENTS

CN    205168896      *  4/2016     ............. B64C 27/32
EP       2690012 A1      1/2014
(Continued)

OTHER PUBLICATIONS

Machine Translaiton of CN205168896.*
European Patent Office; Article 94(3); Application 19 197 081.3-1010; 8 pgs.

*Primary Examiner* — Richard R. Green
*Assistant Examiner* — Ashesh Dangol
(74) *Attorney, Agent, or Firm* — Whitaker Chalk Swindle & Schwa; Enrique Sanchez, Jr.

(57) ABSTRACT

A rotorcraft that utilizes both a main compound rotor and a plurality of tiltrotors is disclosed. The main rotor and the thrusters can provide vertical lift for vertical take-off and landing of the rotorcraft. The thrusters of the rotorcraft can articulate to a horizontal position to facilitate horizontal flight. The main rotor of the rotorcraft can continue to provide vertical lift for the rotorcraft in horizontal flight, as well as operate in an autorotation mode. In the event of a failure of the main power source of the rotorcraft, the main rotor in autorotation mode can safety land the rotorcraft. In the autorotation mode, the main rotor can create electrical energy that is stored in a battery and can be used to power the plurality of thrusters. The rotorcraft can also be configured in an anti-torque mode, where the thrusters cancel out the torque of the main rotor.

10 Claims, 5 Drawing Sheets

(56) References Cited

U.S. PATENT DOCUMENTS

| | | | | |
|---|---|---|---|---|
| 3,426,982 | A * | 2/1969 | Markwood | B64C 27/82 244/7 C |
| 4,347,997 | A * | 9/1982 | Byham | B64C 27/82 244/17.13 |
| 5,419,514 | A * | 5/1995 | Ducan | B64C 29/0033 244/12.4 |
| 6,892,980 | B2 * | 5/2005 | Kawai | B64C 29/0075 244/12.4 |
| D524,718 | S * | 7/2006 | Scott | D12/327 |
| 7,490,792 | B1 * | 2/2009 | Carter, Jr. | B64C 27/001 244/17.27 |
| 7,823,827 | B2 * | 11/2010 | Piasecki | B64C 27/28 244/17.19 |
| D695,205 | S * | 12/2013 | Guzman | D12/326 |
| 8,950,698 | B1 * | 2/2015 | Rossi | B64C 29/0033 244/2 |
| 9,272,778 | B2 | 3/2016 | Eglin | |
| 10,799,733 | B1 * | 10/2020 | Cabrera | B64C 29/0033 |
| 2009/0216392 | A1 * | 8/2009 | Piasecki | B64C 27/08 701/3 |
| 2010/0065677 | A1 * | 3/2010 | Ferrier | B64C 27/26 244/6 |
| 2011/0114798 | A1 * | 5/2011 | Gemmati | B64C 27/26 244/7 R |
| 2013/0134253 | A1 * | 5/2013 | Carter, Jr. | B64C 27/12 244/17.11 |
| 2014/0263820 | A1 * | 9/2014 | Smith | B64C 27/006 244/17.13 |
| 2014/0367509 | A1 * | 12/2014 | Smith | B64D 17/62 244/12.4 |
| 2016/0023751 | A1 | 1/2016 | Lee et al. | |
| 2016/0052626 | A1 * | 2/2016 | Vander Mey | B64C 27/20 244/6 |
| 2016/0214710 | A1 * | 7/2016 | Brody | B64C 29/0033 |
| 2016/0311528 | A1 * | 10/2016 | Nemovi | B64C 27/80 |
| 2017/0197709 | A1 * | 7/2017 | Fink | B64C 1/26 |
| 2019/0337612 | A1 * | 11/2019 | Carter, Jr. | B64C 27/08 |
| 2020/0385106 | A1 * | 12/2020 | Schoppe | B64D 9/003 |

FOREIGN PATENT DOCUMENTS

| | | |
|---|---|---|
| ES | 2604711 A1 | 3/2017 |
| WO | 2016066131 A1 | 5/2016 |

\* cited by examiner

TILTING DUCT COMPOUND HELICOPTER

BACKGROUND

1. Field of the Invention

The present invention is generally related to compound helicopters, and more specifically to compound helicopters incorporating articulating thrusters.

2. Background of the Invention and Description of Related Art

Conventional helicopters and Vertical Take-Off and Landing (VTOL) aircraft suffer from similar disadvantages, such as heavy energy sources, rapid fuel consumption, and limited range due to the rapid fuel consumption. Helicopters provide lift and forward flight using a main rotor. VTOL aircraft utilize a plurality of thrusters to provide lift and forward flight. Because VTOL aircraft have thrusters capable of providing for both vertical lift and horizontal flight, these aircraft do not incorporate a traditional main rotor to generate vertical lift, since the added weight would further degrade aircraft performance. Since VTOL aircraft lack a traditional main rotor, they can experience catastrophic consequences in emergency situations should their thrusters fail. In such emergency situations, aircraft with a main rotor can operate in an autorotation mode, where the main rotor can be used to safely land the aircraft without power. Perhaps the largest issue with any aircraft is weight management. The implementation of additional components for redundant functionality typically comes with the penalty of reducing aircraft performance.

SUMMARY

A compound rotorcraft having articulating thrusters and a main rotor is disclosed that incorporates the desirable properties of each technology by leveraging the desirable properties associated with each of the respective technologies to overcome the undesirable limitations associated with each of the respective technologies when used alone. The present disclosure incorporates aspects of both traditional helicopters and VTOL aircraft, and overcomes the power issues associated with the combination. The present disclosure teaches technical advantages in a rotorcraft that utilizes both a main rotor and a plurality of articulating thrusters. Both the main rotor and the thrusters can be used to be used to provide vertical lift for vertical take-off and landing of the rotorcraft. The thrusters of the rotorcraft can then be configured to articulate to a horizontal position to facilitate horizontal flight. The main rotor of the rotorcraft can continue to provide vertical lift for the rotorcraft during horizontal flight, while in an unpowered autorotation mode, thereby reducing power consumption and enhancing the flight characteristics of the rotorcraft. The air inflow can come up through the main rotor to provide lift while in a windmill state. Since the main rotor is providing lift for the rotorcraft, the power consumption of the thrusters can be minimized since only forward (and not vertical) thrust is required.

While in the autorotation mode, the main rotor can be configured to create electrical energy that is stored in a battery or directly routed to the thrusters. In the event of a failure to the main power source of the rotorcraft, the main rotor can continue to operate in the autorotation mode to safely land the rotorcraft. The electrical energy stored by the battery can be used to power the plurality of thrusters, and thereby assist with the safe landing of the rotorcraft. Further, the rotorcraft can be configured in an anti-torque mode, where the torque experienced by the rotorcraft from the main rotor is canceled out by the torque experienced by the rotorcraft from the thrusters.

The aircraft can utilize a conventional edge wise rotor along with four ducted fans to achieve vertical takeoff and sustained hover. When the rotorcraft transitions to cruise flight on its wing, the thrusters (e.g., ducted fans) can be tilted to align with the flight path. The thrusters can provide anti-torque while in helicopter mode and provide all the propulsive force in forward flight. The main rotor can be in an autorotative state during forward flight. The main rotor inertia can also provide energy for safe landing in the event of system failures and the thrusters can provide a short duration thrust at touchdown through battery-stored energy. The main rotor blades should have suitable mass to maintain the autorotative state, such mass will vary by application. During flight, no power is sent to the main rotor which allows the aircraft to conserve power as the thrusters only need to be powered to maintain the forward flight speed.

Accordingly, one embodiment of the present disclosure includes a compound rotorcraft, comprising: an airframe structure; a plurality thrusters operably coupled to the airframe structure, the thrusters operably rotatable between a vertical lift position and a horizontal cruise position, the thrusters configured to provide vertical thrust in the vertical lift position and horizontal thrust in the horizontal cruise position at a cruise speed; a main rotor operably coupled to the airframe structure, the main rotor configured to operate in an autorotation mode when the rotorcraft reaches the cruise speed in horizontal flight, the main rotor configured to generate electrical energy while operating in autorotation mode. The compound rotorcraft can further include a battery configured to store the electrical energy generated by the main rotor assembly. The electrical energy stored by the battery can be configured to power the plurality of thrusters. The plurality of thrusters can be ducted fans. The main rotor can be further configured to generate vertical lift. The main rotor can be further configured to generate vertical lift when operating in the autorotation mode. The compound rotorcraft can further comprise a primary energy source configured to power the plurality of thrusters. The primary energy source can be a battery. The airframe structure can be a fuselage. The main rotor can mechanically disengage a drive system in the autorotation mode.

Another embodiment of this disclosure includes a method for powering thrusters of a rotorcraft, comprising: generating electrical energy with a main rotor in an autorotation mode while the rotorcraft is in horizontal flight; storing the electrical energy generated by the main rotor in a battery; and powering a plurality of thrusters with the stored electrical energy in the battery. The method can further comprise generating vertical lift with the main rotor when the main rotor is in the autorotation mode. The generating electrical energy step of the method can occur when a specified cruise speed is achieved by the rotorcraft in horizontal flight. The powering step of the method can occur when the thrusters fail to receive energy from a primary energy source. The method can further comprise further propelling the rotorcraft in horizontal flight using a plurality of thrusters. The powering step of the method can occur to assist in providing vertical lift to the rotorcraft in an emergency landing.

Another embodiment of this disclosure includes a rotorcraft with an anti-torque mode, comprising: a main rotor exerting a torque on a fuselage; a first ducted fan having a horizontal stator deflected aft; a second ducted fan having a horizontal stator deflected forward; a third ducted fan having a vertical stator deflected inboard; and a fourth ducted fan having a vertical stator deflected outboard, wherein the ducted fans are operably positioned to cancel the torque exerted by the main rotor on the fuselage. The first and second ducted fans can be forward of the third and fourth ducted fans. The ducted fans can include both horizontal and vertical stators. The stators of the rotorcraft can be positioned to control the yaw of the rotorcraft.

DETAILED DESCRIPTION

The preferred version of the inventions presented in the following written description and the various features and advantageous details thereof are explained more fully with reference to the non-limiting examples included in the accompanying drawings and as detailed in the description which follows. Descriptions of well-known components are omitted so as to not unnecessarily obscure the principle features of the invention as described herein. The examples used in the following description are intended to facilitate an understanding of the ways in which the invention can be practiced and to further enable those skilled in the art to practice the invention. Accordingly, these examples should not be construed as limiting the scope of the claimed invention.

Figure 1:
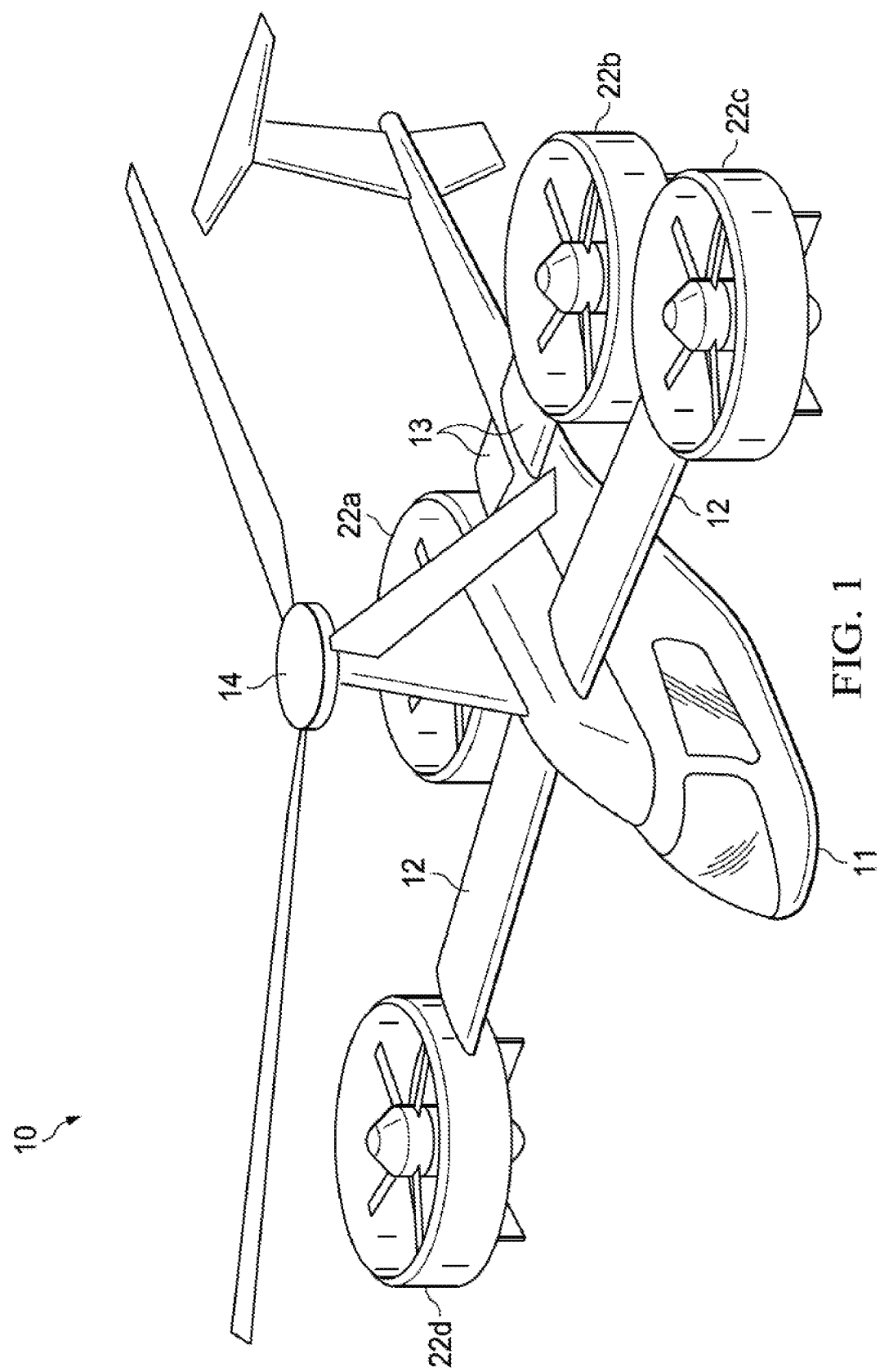
FIG. 1 is a perspective view of a compound rotorcraft configured for vertical lift, in accordance with an embodiment of the present disclosure.

FIG. 1 is a perspective view of a compound rotorcraft, designated generally as 10, in accordance with an embodiment of the present disclosure. The compound rotorcraft 10 can include an airframe structure. The airframe structure can include a fuselage 11, a forward wing 12, and an aft wing 13. The forward wing 12 and aft wing 13 can be canard wings. The compound rotorcraft 10 can also include a main rotor 14 operably coupled to the fuselage 11. The rotorcraft 10 can further include a plurality of thrusters, collectively designated as 22. The rotorcraft 10 preferably includes four thrusters $22_a$, $22_b$, $22_c$, and $22_d$. Alternatively, any number of thrusters 22 can be implemented dependent on the particular application. The thrusters $22_a$ and $22_b$ can be operably coupled to either end of the aft wing 13 and the thrusters $22_a$ and $22_b$ can be operably coupled to either end of the forward wing 12. In a preferred embodiment thrusters $22_a$, $22_b$, $22_c$, and $22_d$ can be ducted fans. However thrusters $22_a$, $22_b$, $22_c$, and $22_d$ can be rotors, propellers, jet engines, or other suitable thrust generating components.

In one embodiment, the main rotor 14 can be configured to provide vertical lift for the rotorcraft 10 for vertical take-off of the rotorcraft. The main rotor 14 can be powered by a main rotor engine 16 to produce vertical lift for take-off.

In one embodiment the main rotor engine 16 can be an electric engine. In another embodiment the main rotor engine 16 can be an internal combustion motor. In another embodiment the main rotor motor 16 can be a hybrid motor powered by both electricity and an internal combustion fuel, such as aviation gasoline or Jet-A.

The main rotor motor 16 can be supplied energy from a primary energy source 15. In embodiments where the main rotor engine 16 is an electric motor, the primary energy source 15 can be a component that supplies the electric motor with electrical energy, such as a battery or generator. In embodiments where the rotor engine 16 is an internal combustion motor, the primary energy source 15 can be a component that supplies the internal combustion motor with fuel, such as a fuel storage tank. In embodiments where the rotor engine 16 is a hybrid motor that can be powered by both electricity and an internal combustion fuel, the primary energy source 15 can be either a component that supplies the internal combustion motor with fuel, or a component that supplies the electric motor with electrical energy, or a combination of the two.

The thrusters $22_a$, $22_b$, $22_c$, and $22_d$ can be articulating thrusters that are rotatable between a vertical lift position and a horizontal cruise position. All of the thrusters $22_a$, $22_b$, $22_c$, and $22_d$ can be vertically facing in the vertical lift position, such that the thrusters $22_a$, $22_b$, $22_c$, and $22_d$ can provide vertical lift for the rotorcraft and assist the main rotor 14 in the vertical take-off and landing of the rotorcraft 10. Further, the thrusters $22_a$, $22_b$, $22_c$, and $22_d$ and the main rotor 14 can be used together to allow the rotorcraft to hover in a particular location. In another embodiment, the main rotor 14 can provide vertical take-off, landing, and hovering of the rotorcraft 10, while the thrusters 22 are idle. In yet another embodiment, the thrusters $22_a$, $22_b$, $22_c$, and $22_d$ can be used without the assistance of the main rotor 14 for vertical take-off, landing, and hovering of the rotorcraft 10.

Figure 2:
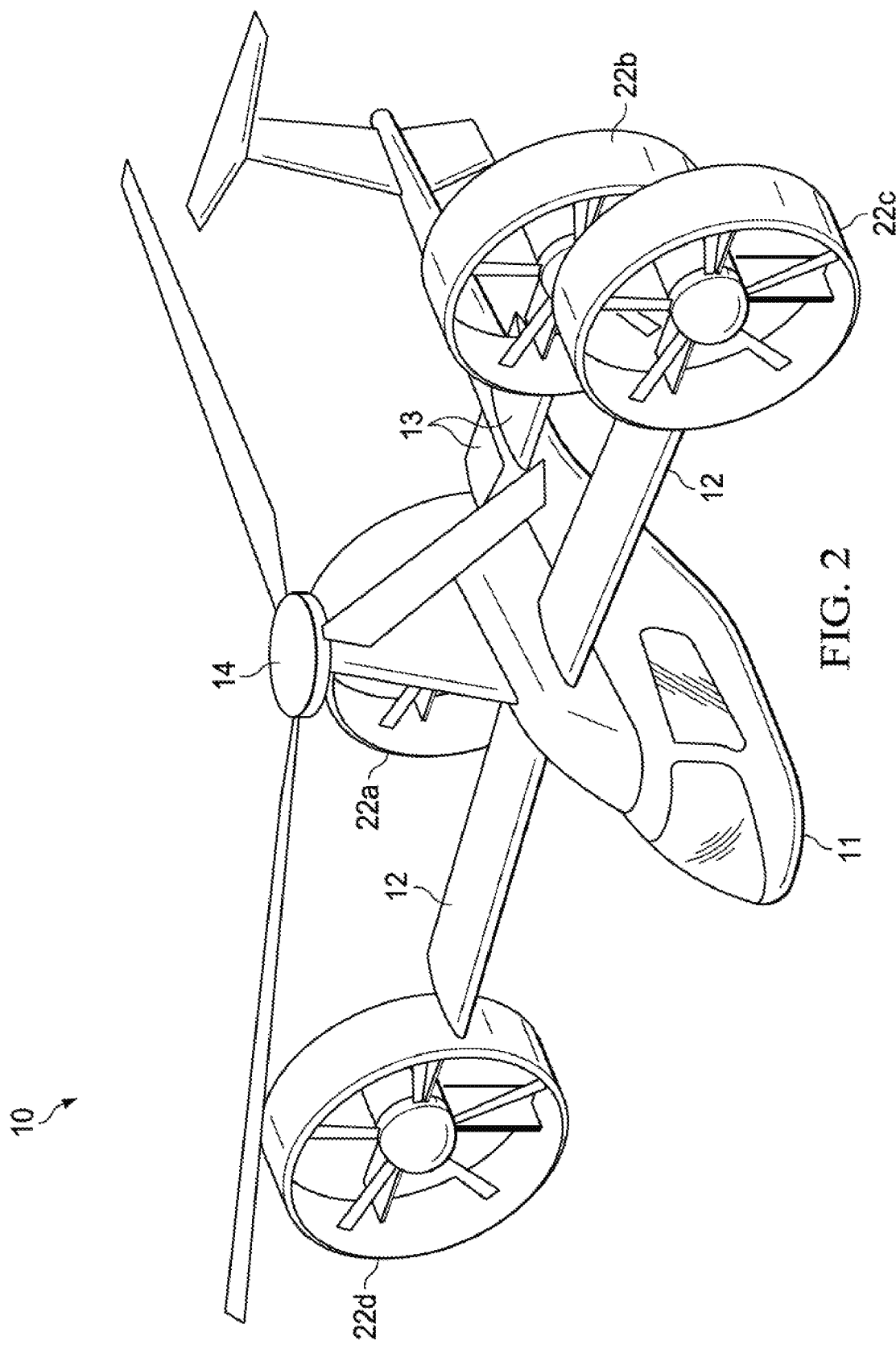
FIG. 2 is a perspective view of a compound rotorcraft configured for horizontal flight, in accordance with an embodiment of the present disclosure.

In FIG. 2, the thrusters $22_a$, $22_b$, $22_c$, and $22_d$ are shown in a horizontal cruise position. The thrusters $22_a$, $22_b$, $22_c$, and $22_d$ can rotate into a horizontal cruise position where the thrusters can be horizontally facing. For horizontal flight of the rotorcraft 10, only the thrusters $22_a$, $22_b$, $22_c$, and $22_d$ provide horizontal thrust to propel the rotorcraft in horizontal flight. To achieve horizontal thrust, the thrusters $22_a$, $22_b$, $22_c$, and $22_d$ can be configured in the horizontal cruise position. A number of existing means of technology can be used to rotate the thrusters $22_a$, $22_b$, $22_c$, and $22_d$ between the vertical lift and horizontal flight positions. Traditionally, actuators have been utilized to achieve this type of rotation. In one embodiment, while the rotorcraft is in horizontal flight, the main rotor 14, powered by the main rotor engine 16, can be configured to provide vertical lift for the rotorcraft 10.

Figure 3:
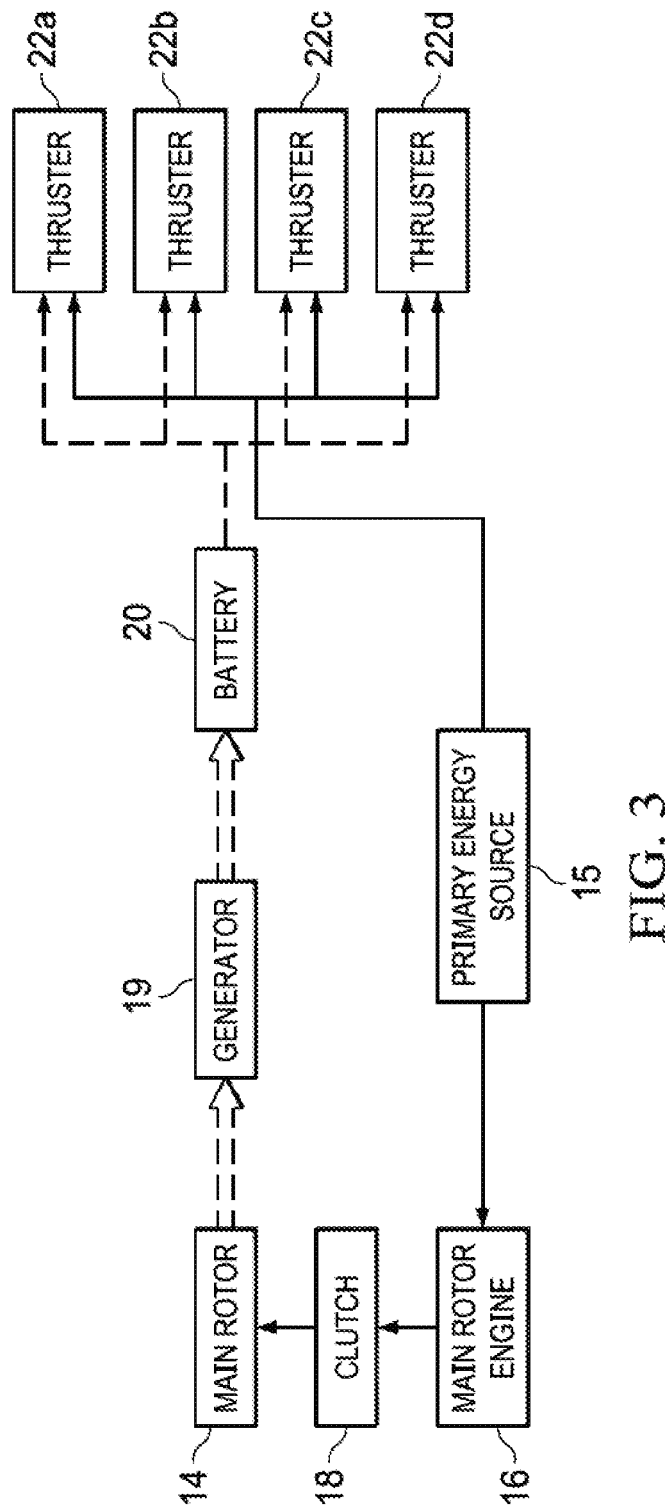
FIG. 3 is a schematic of a power system of a compound rotorcraft, in accordance with an embodiment of the present disclosure.

FIG. 3 is a schematic showing how power can be distributed between the different components of the rotorcraft 10. The solid arrows show the direction of the flow of energy when in the rotorcraft 10 is under normal operation. The dashed double-line arrows going from the main rotor 14 to the generator 19 to the battery 20 show the flow of energy coming from the main rotor 14 when in the autorotation mode, as will be described in greater detail below. The dotted lines between the battery 20 and the thrusters $22_a$, $22_b$, $22_c$, and $22_d$ show the flow of energy in the event of failure to the primary energy source 15, as described in greater detail below.

In the preferred embodiment, the rotorcraft 10 can be propelled by the thrusters 22 to a specific cruise speed while in horizontal flight. In a preferred embodiment, this cruise speed can preferably range between 50 to 80 knots. Alternatively, the cruise speed can be any predetermined speed of the rotorcraft 10 needed to facilitate an autorotation mode of the main rotor 14. Once the cruise speed is reached by the rotorcraft 10, the main rotor can disengage from the drivetrain of the main rotor engine 16 and operate in an autorotation mode. In one embodiment, once the cruise speed is reached by the rotorcraft 10, a clutch 18 can be configured to disengage the main rotor 14 from the main rotor engine 16, such that the main rotor 14 is not powered by the main rotor engine 16. Once disengaged from the main rotor engine 16, the main rotor 14 can be configured to windmill or spin freely. In the preferred embodiment, the main rotor 14 can be configured to disengage the main rotor engine 16 via the clutch 18 when the rotorcraft 10 reaches the horizontal flight cruise speed.

In the autorotation mode, the main rotor 14 turns by the airflow through the main rotor 14 at the cruise speed, rather than main rotor engine 16 driving the main rotor. Importantly, the autorotation can occur during normal operation of the aircraft and not just during an emergency landing. The main rotor 14 can be configured such that when turning in the autorotation mode, the main rotor can still provide vertical lift for the rotorcraft 10. In one embodiment, the main rotor 14 can be configured to provide vertical lift for the rotorcraft 10 while traveling in horizontal flight at the cruise speed. The main rotor 14 ceases to be powered when the desired flight speed is achieved.

In a preferred embodiment, while in the autorotation mode, the main rotor 14 can be configured to charge a battery 20. The main rotor 14, while spinning in autorotation mode, can be configured to turn the shaft of a generator 19. The generator 19 can be configured to create electrical energy from the turning of the shaft by the main rotor 14 turning in the autorotation mode, and store that electrical energy in the battery 20. This disclosure is not limited to generating electricity with a generator 19. Electrical energy can be generated in any way using the main rotor 14 while in the autorotation mode. The electrical energy need not be stored in a battery, but can be provided directly to the thrusters 22, thereby minimizing the battery size and weight.

The main rotor 14 can also be utilized in the autorotation mode to land the rotorcraft 10. In one embodiment, the main rotor 14 can be used in autorotation mode to land the rotorcraft 10 in the event of a failure of the primary energy source 15 in supplying the thrusters 22 with energy for sustained horizontal flight of the rotorcraft 10. In one embodiment, the main rotor 14, in autorotation mode, can be used to safely land the rotorcraft 10 without the use of any energy from the primary energy source 15. Energy supply can be disrupted due to fuel leak, supply line degradation, or other event.

In the preferred embodiment, the battery 20 can be used to power the thrusters $22_a$, $22_b$, $22_c$, $22_d$ in the event of a failure of the primary energy source 15 in supplying energy to the thrusters. In such an event, as previously described, the main rotor 14 can be configured to continue in autorotation mode to land the rotorcraft 10. As the rotorcraft 10 approaches the ground to land, the battery 20 can deliver the electrical energy that it has stored while in horizontal flight to the thrusters $22_a$, $22_b$, $22_c$, $22_d$. The electrical energy from the battery 20 can be used to position the thrusters $22_a$, $22_b$, $22_c$, $22_d$ in their vertical lift positions, as depicted in FIG. 1. The electrical energy from battery 20 can further give the thrusters $22_a$, $22_b$, $22_c$, $22_d$ enough electrical energy for the thrusters to create thrust while positioned in the vertical lift position. In one embodiment, the thrusters $22_a$, $22_b$, $22_c$, $22_d$ can configured to create the vertical thrusts when the rotorcraft 10 is close to landing in the autorotation mode, so as to assist in creating a soft landing for the rotorcraft 10. The thrusters $22_a$, $22_b$, $22_c$, $22_d$ can use the electrical energy stored by the battery 20 in any way and at any time.

Figure 4:
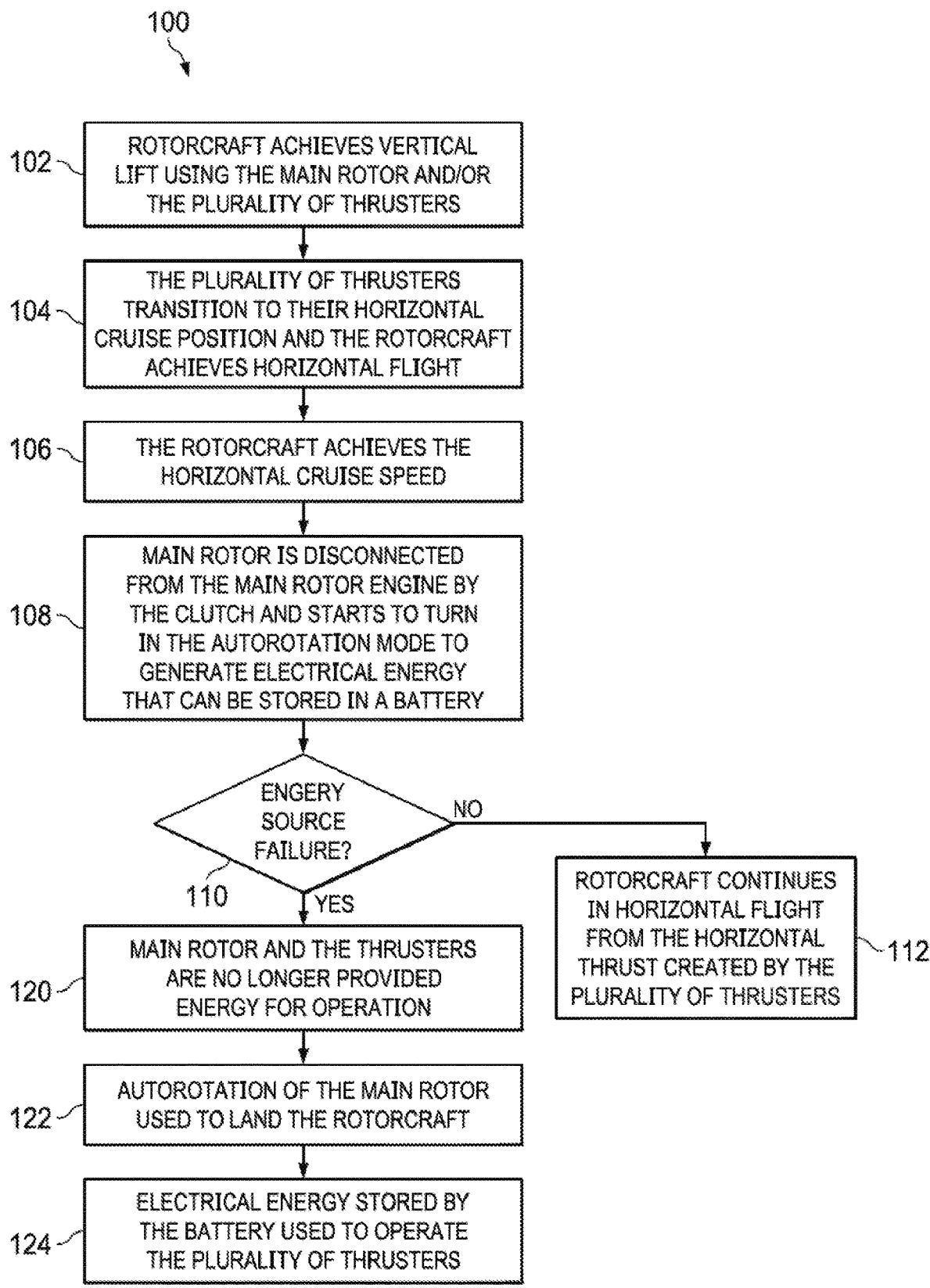
FIG. 4 is a flowchart for a method of operation of compound rotorcraft, in accordance with an embodiment of the present disclosure.

FIG. 4 is a flowchart of a method 100 for operating the rotorcraft 10. The method begins at 102, where the rotorcraft 10 achieves vertical lift. In one embodiment vertical lift is achieved by both the main rotor 14 and the plurality of rotors $22_a$, $22_b$, $22_c$, $22_d$. In one embodiment the vertical lift is achieved by only the main rotor 14. In another embodiment the vertical lift can be achieved by only the plurality of rotors $22_a$, $22_b$, $22_c$, $22_d$. The method then proceeds to 104.

At 104, the thrusters $22_a$, $22_b$, $22_c$, $22_d$ can transition to their horizontal cruise position and allow the rotorcraft 10 to achieve horizontal flight. The thrusters 22 can transition to a horizontal cruise position via an actuator or other suitable device. The then method proceeds to 106.

At 106, the rotorcraft 10 achieves the horizontal cruise speed. The horizontal cruise speed can be achieved via the propulsive force of the thrusters 22. The method then proceeds to step 108.

At 108, the main rotor 14 is disengaged from the main rotor engine 16 by the clutch 18 to operate in the autorotation mode. While operating in the autorotation mode, the main rotor 14 can generate electrical energy that can be stored in a battery 20 or provided directly to the thrusters 22. In one embodiment, the main rotor 14 operating in autorotation mode can spin a shaft of a generator 19 configured create electrical energy, which can then be stored in the battery 20. The method then proceeds to 110.

At 110, it is determined whether there is a failure of the primary energy source 15 such that the main rotor 14 or thrusters $22_a$, $22_b$, $22_c$, $22_d$ are no longer provided energy for operation. If there is a primary energy source 15 failure, the method proceeds to step 120. If there is not a primary energy source 15 failure, the method proceeds to step 112.

At 112, the rotorcraft 10 can continue in horizontal flight from the horizontal thrust created by the plurality of thrusters 22. The main rotor 14 can continue to operate in the autorotation mode and can be configured to generate lift while in the autorotation mode for the rotorcraft 10 in horizontal flight. While in the autorotation mode, the main rotor 14 can be configured to continue to generate electrical energy that can be stored in battery 20 or supplied directly to the thrusters 22.

At 120, the main rotor 14 and the thrusters 22 are no longer provided energy for operation. The supply of energy can be disrupted due to fuel leak, supply line degradation or cutting, or other event. The method then proceeds to 122.

At 122, autorotation of the main rotor 14 can be used to land the rotorcraft 10. The main rotor 14 of the rotorcraft 10 continues to provide lift while in the autorotation mode. Although not sufficient to maintain the rotorcraft 10 in hover, the lift is sufficient to slow the decent of the rotorcraft 10 toward the ground. The method then proceeds to 124.

At 124, the electrical energy stored by the battery 120 can be used to operate the thrusters 22. In one embodiment the thrusters $22_a$, $22_b$, $22_c$, $22_d$ can use the energy stored by the battery 20 to rotate to the vertical lift positions and provide thrust when the rotorcraft is close to landing to assist the main rotor 14 in safely landing the rotorcraft. Alternatively, the battery can be bypassed and the electrical energy created by the main rotor 14 can be supplied directly to the thrusters 22.

Figure 5:
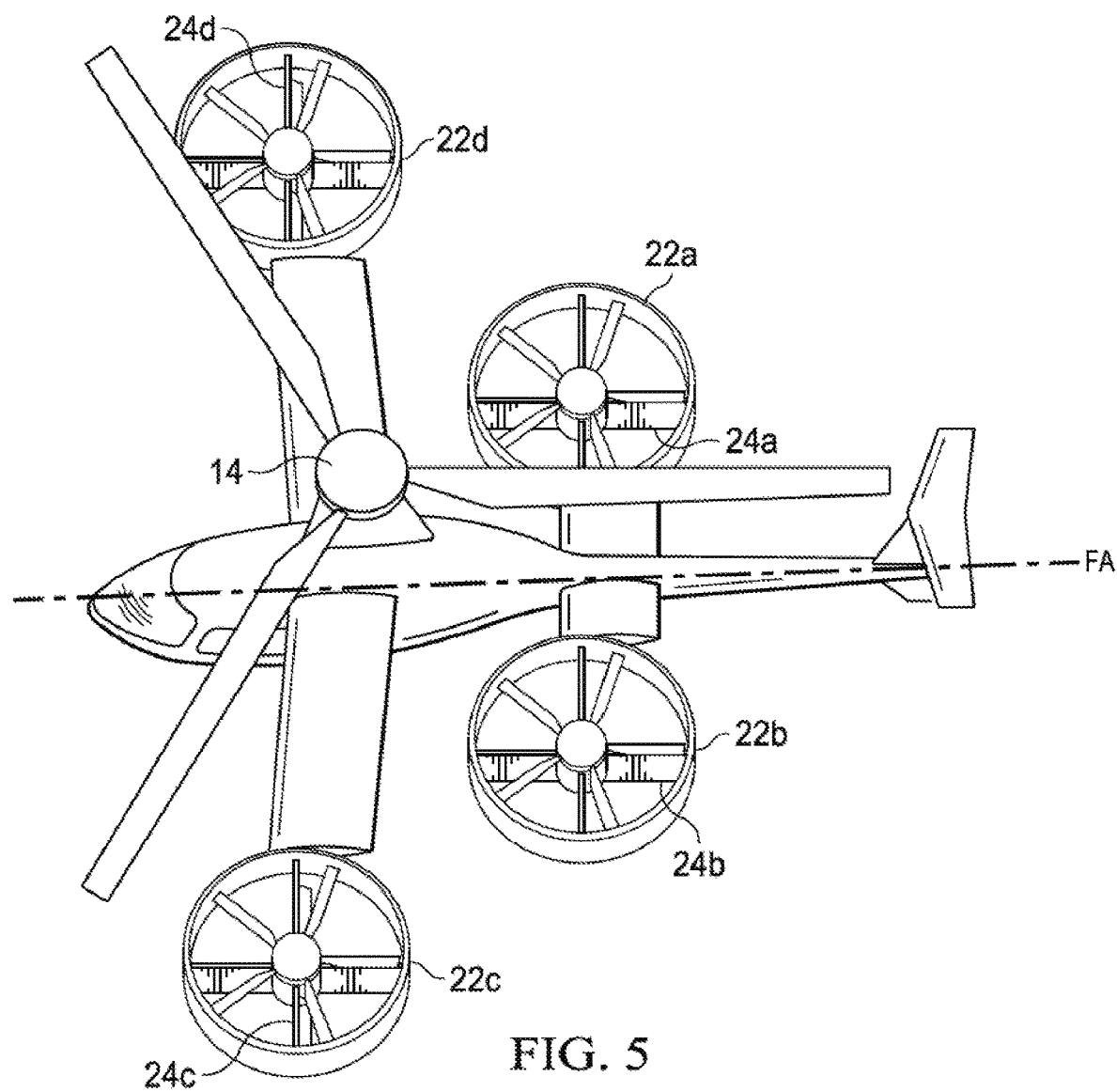
FIG. 5 is a perspective view of a compound rotorcraft configured in an anti-torque mode, in accordance with an embodiment of the present disclosure.

Referring now to FIG. 5, the rotorcraft 10 can be configured to provide an anti-torque mode. The anti-torque mode can be used when the main rotor 14 is used in creating vertical lift for the rotorcraft 10. In the anti-torque mode, the thrusters 22 can be configured to cancel out the torque experienced by the rotorcraft 10 from the rotation of the main rotor 14. In one embodiment, if the main rotor 14 turns counterclockwise in operation, the torque experienced by the rotorcraft 10 will make the rotorcraft want to spin counterclockwise. In a preferred embodiment, the thrusters 22$_a$, 22$_b$, 22$_c$, and 22$_d$ can be configured to produce thrust in a clockwise direction with respect to the rotorcraft 10 such that the rotorcraft experiences a torque from the thrusters in amount equal to and opposite of the torque produced by the main rotor 14. The rotorcraft 10 can experience a net torque of zero, due to the canceled-out torques of the main rotor 14 and the plurality of thrusters 22.

In another anti-torque mode embodiment of the rotorcraft 10, stators 24$_a$, 24$_b$, 24$_c$, and 24$_d$ can be used to direct the thrust direction of the thrusters 22$_a$, 22$_b$, 22$_c$, 22$_d$. The stator 24$_a$ can be vertically-positioned and deflected inboard. Stator 24$_b$ can be vertically positioned and deflected outboard. The stators 24$_a$ and 24$_b$ can be vertically positioned so that the stators are generally parallel to the rotorcraft fuselage axis FA. Stator 24$_c$ can be horizontally positioned and deflected forward. Stator 24$_d$ can be horizontally positioned and deflected aft. The stators 24$_c$ and 24$_d$ can be horizontally positioned so that they are generally perpendicular to the fuselage axis FA. In this configuration, the stators 24$_a$, 24$_b$, 24$_c$, and 24$_d$ can counteract the torque developed by the main rotor 14.

The present invention achieves at least the following advantages:

1. significant decrease in power requirement by utilizing the main rotor's autorotation to provide vertical lift during forward flight;
2. weight reduction by elimination of any wings, as the auto-rotating main rotor can provide the lift of a wing during forward flight; and
3. power system redundancy.

While the disclosure has described a number of embodiments, it is not thus limited and is susceptible to various changes and modifications without departing from the spirit thereof. Persons skilled in the art will understand that this concept is susceptible to various changes and modifications, and may be implemented or adapted readily to other types of environments. For example, different thruster location and count, as well as multiple main rotor blade sizing are all within the scope of the present disclosure. Further, the individual elements of the claims are not well-understood, routine, or conventional. Instead, the claims are directed to the unconventional inventive concept described in the specification.

What is claimed is:

1. A compound rotorcraft, comprising:
    an airframe structure;
    a plurality of thrusters operably coupled to the airframe structure, the thrusters operably rotatable between a vertical lift position and a horizontal cruise position, the thrusters configured to provide vertical thrust in the vertical lift position and horizontal thrust in the horizontal cruise position at a cruise speed; and
    a main rotor operably coupled to the airframe structure, the main rotor configured to operate in an autorotation mode when the rotorcraft reaches the cruise speed in horizontal flight, the main rotor configured to generate electrical energy while operating in autorotation mode,
    wherein, in the event of a failure of a primary energy source, the main rotor is configured to continue in the autorotation mode and generate electrical energy driving the plurality of thrusters.

2. The rotorcraft of claim 1, further comprising a battery configured to store the electrical energy generated by the main rotor assembly.

3. The rotorcraft of claim 2, wherein the electrical energy stored by the battery is configured to power the plurality of thrusters.

4. The rotorcraft of claim 1, wherein the plurality of thrusters are ducted fans.

5. The rotorcraft of claim 1, wherein the main rotor is further configured to generate vertical lift.

6. The rotorcraft of claim 1, wherein the main rotor is further configured to generate vertical lift when operating in the autorotation mode.

7. The rotorcraft of claim 1, further comprising a primary energy source configured to power the plurality of thrusters.

8. The rotorcraft of claim 7, wherein the primary energy source is a battery.

9. The rotorcraft of claim 1, wherein the airframe structure is a fuselage.

10. The rotorcraft of claim 1, wherein the main rotor mechanically disengages a drive system in the autorotation mode.

* * * * *